United States Patent [19]

Ishihara et al.

[11] Patent Number: 5,754,429
[45] Date of Patent: May 19, 1998

[54] SYSTEM FOR DISPLAYING TRACK OF A MOVING BODY

[75] Inventors: Shinji Ishihara, Takarazuka; Takehiko Nishimura, Ikoma, both of Japan

[73] Assignee: Furuno Electric Company, Limited, Hyogo, Japan

[21] Appl. No.: 443,385

[22] Filed: May 17, 1995

Related U.S. Application Data

[63] Continuation of Ser. No. 66,159, filed as PCT/JP92/01294 Oct. 5, 1992, abandoned.

[30] Foreign Application Priority Data

Oct. 4, 1991 [JP] Japan ................... 3-257512
Jul. 29, 1992 [JP] Japan ................... 4-202215

[51] Int. Cl.⁶ .................. G01C 21/10; G01S 7/22
[52] U.S. Cl. .................. 364/443; 364/436; 342/41; 340/558
[58] Field of Search ................ 364/436, 437, 364/439, 441, 443, 447, 460, 461; 340/958, 961, 971; 318/588; 342/41; 345/157, 159, 160, 161

[56] References Cited

U.S. PATENT DOCUMENTS

| Re. 25,756 | 4/1965 | Balding | 340/971 |
|---|---|---|---|
| Re. 32,357 | 2/1987 | Nagao et al. | 364/449 |
| 3,725,918 | 4/1973 | Fleischer | 342/41 |
| 3,754,247 | 8/1973 | Hansford | 73/178 |
| 3,971,018 | 7/1976 | Isbister et al. | 342/41 |
| 4,340,936 | 7/1982 | Mounce | 364/443 |
| 4,405,986 | 9/1983 | Gray | 364/453 |
| 4,633,909 | 1/1987 | Numata et al. | 364/443 |
| 4,713,767 | 12/1987 | Sato et al. | 364/453 |
| 4,747,359 | 5/1988 | Ueno | 318/588 |
| 4,999,783 | 3/1991 | Tenmoku et al. | 364/447 |
| 5,032,842 | 7/1991 | Tanigaki et al. | 342/182 |
| 5,065,161 | 11/1991 | Shibutani | 342/182 |
| 5,089,816 | 2/1992 | Holmes, Jr. | 340/971 |
| 5,209,682 | 5/1993 | Duning et al. | 318/588 |
| 5,214,414 | 5/1993 | Levine et al. | 345/157 |
| 5,227,786 | 7/1993 | Hancock | 364/439 |
| 5,247,466 | 9/1993 | Shimada et al. | 364/453 |

FOREIGN PATENT DOCUMENTS

| 55-146006 | 11/1980 | Japan. |
|---|---|---|
| 56-31602 | 3/1981 | Japan. |
| 57-73617 | 5/1982 | Japan. |
| 60-164278 | 8/1985 | Japan. |
| 61-22275 | 1/1986 | Japan. |
| 62-214315 | 9/1987 | Japan. |
| 2025722 | 7/1978 | United Kingdom. |

Primary Examiner—Kevin J. Teska
Assistant Examiner—Tyrone V. Walker

[57] ABSTRACT

The present invention relates to a display system for displaying a past track of the ship, the present position of the ship, and a future predicted track of the ship. A display system according to the present invention generates coordinate data representing a desired pattern based on the ship's speed and the ship's bearing in order to display a past track of the ship and a future predicted track of the ship.

83 Claims, 10 Drawing Sheets

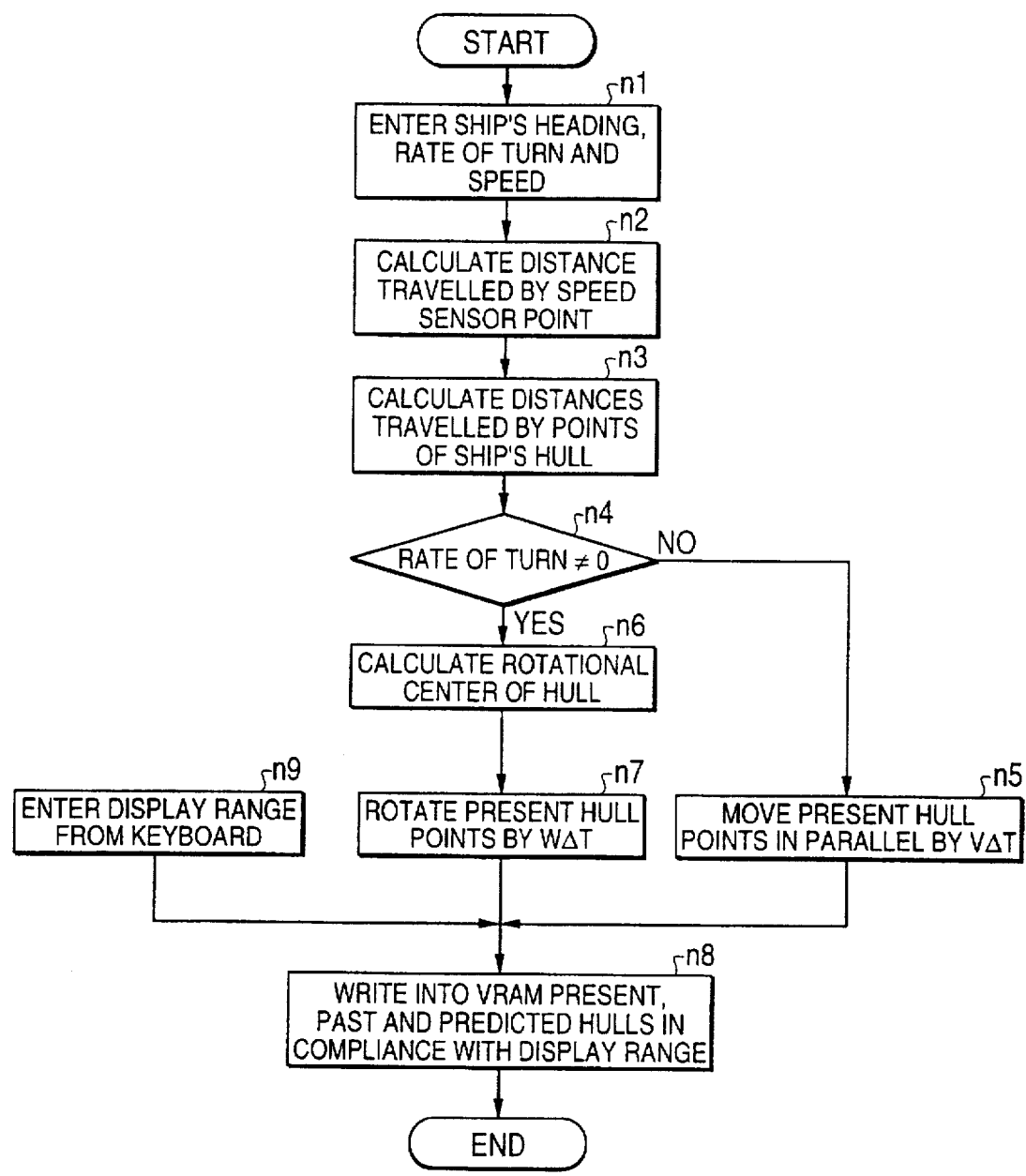

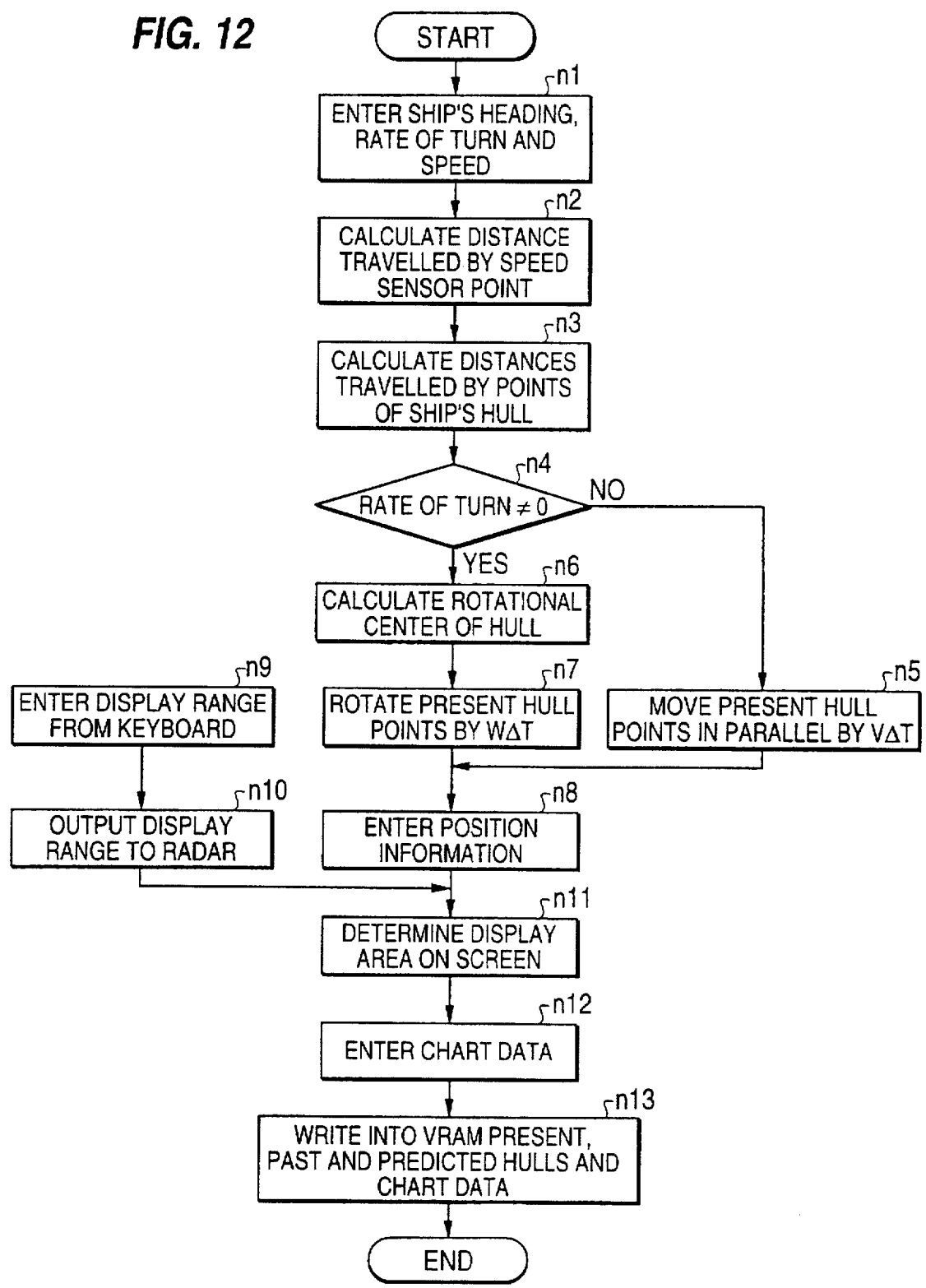

SYSTEM FOR DISPLAYING TRACK OF A MOVING BODY

This application is a continuation, of application Ser. No. 08/066,159, filed as PCT/JP92/01294 Oct. 5, 1992, now abandoned.

TECHNICAL FIELD

The present invention relates to a display system for displaying a past track of a moving body and a future predicted track thereof. The invention also relates to a display system for displaying the shape of a moving body as superimposed on the earth surface at the same scale.

Hereinafter, the present invention will be explained as embodied in a ship's maneuvering assistance system used in berthing operations.

PRIOR ART

For large-sized vessels such as tankers, there is required very careful and high-level maneuvering technique in terms of safety when the ship approaches or leaves a pier. As support systems used for this purpose, there have been available Doppler sonars and berthing speedometers, which measure the ship speed with high accuracy. These instruments are, in general, capable of providing information not only on parallel movements of a ship in a fore-aft direction of or in an athwartship direction of the hull but also on its turning movements, by measuring the ship's speed at the bow in a fore-aft direction and the ship's speed at the stern of the ship in an athwartship direction.

However, these instruments only display a present advancing speed of the ship and a present advancing direction thereof, and present speeds of the ship at the bow and stern thereof respectively, in the left and right directions in numerical values, as shown in FIG. 10. There were no displays with regard to the past movements of the hull of the ship and the like. To conceive a moving manner of the ship, it has been necessary to observe variation of a numerical value representing the speed of the ship for a while. Accordingly, a necessary navigational instruction could not be presented promptly. It has also been difficult to conceive precisely the moving manners or the movements of the ship merely from variations in the numerical values.

DISCLOSURE OF THE INVENTION

An object of the present invention is to provide a display system which is capable of displaying a past track and a future predicted track of a moving body.

Another object of the invention is to provide a display system which is capable of displaying a past track and future predicted track of the own ship.

Still another object of the invention is to provide a display system for displaying the present position of the ship, a past track of the ship and a future predicted track of the ship with shapes of the hull of the ship.

A further object of the invention is to provide a display system for displaying the shape of an moving body as superimposed on the earth surface at the same scale.

A still further object of the invention is to provide a display system for displaying the shape of a ship's hull as superimposed on the earth surface at the same scale.

Still another object of the invention is to provide a display system for displaying the shapes of a ship's hull as superimposed on the earth surface at the same scale, with groups of the shapes respectively representing the present position of the own ship, a past navigation trace of the ship and a future predicted trace of the ship.

Still another object of the invention is to provide a display system for displaying the shape of the ship, other objects existing in surrounding areas around the ship and the earth surface at the same scale.

Still another object of the invention is to provide a ship manoevring assistance system which is capable of displaying the form of the ship, a pier and the earth surface at the same scale so that relative relations among them can be easily grasped.

Still another object of the invention is to provide a display system for displaying groups of shapes of a hull respectively representing the present position of the ship, a past navigation track of the ship and a future predicted track of the ship with respect to piers as superimposed on the earth surface at the same scale.

Still another object of the invention is to provide a display system for displaying the shape of the ship and radar images on the display surface of an indicator at the same scale.

Still another object of the invention is to provide a display system for displaying groups of shapes of the ship representing respectively the present position of the ship, a past navigation track of the ship, and a future predicted track of the ship and radar images as superimposed one on another at the same scale.

Still another object of the invention is to provide a ship maneuvering assistance system for displaying piers, groups of shapes of a ship's hull respectively representing the present position of the ship, a past navigation track of the own ship and a future predicted track of the ship, and radar images as superimposed one on another at the same scale.

A first feature of the present invention is to provide a display system which comprises speed detection means for detecting the speed of a ship, bearing detection means for detecting a bearing of the ship with respect to a reference bearing, rate of turn measuring means for detecting the turning speed of the ship's hull, storing means for successively storing ship's speeds output from the speed detection means and ship's bearings output from the bearing detection means, coordinate-data generating means for generating coordinate data representing a desired pattern based on the ship's speeds and the ship's bearings read out from the storing means, and the turning speed of the ship's hull output from the rate of turn measuring means in order to display a past track of the ship and a futrue predicted track of the ship with the pattern, coordinate-data storing means for storing the coordinate data, and an indicator for displaying the signals read from the coordinate-data storing means.

It is also to display a past track of the ship or a future predicted track of the ship or a past track and a future predicted track of the ship with a pattern of shapes of the ship.

A second feature of the present invention is to provide a ship maneuvering assistance system which comprises speed detection means for detecting the speed of a ship, bearing detection means for detecting a bearing of the ship with respect to a reference bearing, rate of turn measuring means for detecting rate of turn of the ship, storing means for successively storing speeds of the ship output from the speed detection means and the ship's bearings output from the bearing detection means, ship's hull point storing means for storing signals representing a plurality of points of the ship's hull, coordinate-data generating means for generating coordinate data representing a pattern of shapes of the ship based on the ship's speeds and ship's bearings read out from the storing means, the signals representing the plurality of points of the ship's hull read out from the ship's hull point storing means and the rate of turn of the ship output from said rate of turn measuring means in order to display a past track of the ship or a future predicted track of the ship or a past and future predicted track of the ship with the pattern, land form storing means for storing signals representing land forms such as lands or islands, coordinate-data storing means for storing the coordinate data and the signals representing land forms read out from the land form storing means, and an indicator for displaying the signals read from the coordinate-data storing means.

A third feature of the present invention is to provide a display system which comprises speed detection means for detecting the speed of a ship, bearing detection means for detecting a bearing of the ship with respect to a reference bearing, rate of turn measuring means for detecting the turning speed of the ship, storing means for successively storing the ship's speeds output from the speed detection means and the ship's bearings output from the bearing detection means, coordinate-data generating means for generating coordinate data representing a desired pattern based on the ship's speeds and the ship's bearings output from the storing means and the turning speed of the ship output from the rate of turn measuring means in order to display a past track of the ship and a future predicted track of the ship or a past and future predicted track of the ship with the pattern, coordinate-data storing means for storing the coordinate data, radar signal supply means for supplying radar image signals, and an indicator for displaying the signals read from the coordinate-data storing means and the radar image signals supplied from the radar signal supply means.

The basic principle of the present invention is as follows.

It is assumed that the coordinates of respective points of the ship's hull P1 through P7 have been previously set with respect to the origin at which a ship's speed measuring device is installed, as shown in FIG. 2.

As shown in FIG. 3, it is assumed that the heading of the ship at a time instant t0 is θ0, and the X-axis and Y-axis of Cartesian coordinates coincide with an east-and-west direction and a north-and-south direction respectively. Coordinates Q1 through Q7 corresponding to the hull-points P1 through P7 are obtained by rotating the coordinates of the points P1 through P7 in FIG. 2 respectively about the origin "O" by an angle corresponding to the ship's heading θ0.

Next, assuming that, at another time instant t0+Δt, ship speed components in an east and a north directions at a heading "θ" are VE and VN respectively, respective coordinates Q1' through Q7' corresponding to the hull-points P1 through P7 can be obtained by rotating the coordinates Q1 to Q7 at the time t0 by (θ−θ0) respectively and then moving, in parallel with the axes, these coordinates in the east and north directions by ΔDE (=VE×Δt) and ΔDN (=VN×Δt), respectively.

In this way, the coordinates Q and Q' are obtained and then differences between Q and Q' are obtained so that distances travelled by respective points of the ship are determined. By repeating this operation, past total distances travelled by and coordinates of the points are calculated so that a past track of the ship is determined.

Next, there will be explained future predicted positions of points of the ship (ship's track). As shown in FIG. 4, it is assumed that, at a time instant t0, a ship's heading is θ0, the coordinates of points of the ship's hull are Q1 through Q7, ship speed components are VE and VN, and the rate of turn of the ship is ω. Then, the coordinates of the rotational center R of the hull can be obtained in accordance with the following equation:

$$R(E, N) = (VN/\omega, -VE/\omega)$$

Accordingly, the coordinates Q1' through Q7' of the respective points of the hull at another time instant t0+ΔT after a time ΔT elapses can be obtained by rotating the coordinates Q1 through Q7 about the rotational center R by an angle of ω×ΔT in the coordinates system.

The above description has been made on a case where the ship is turning (ω≠0). In the case of parallel movement (ω=0), predicted coordinates Q1' through Q7' of the points of the ship can be determined by adding VE×ΔT and VN×ΔT to each of the coordinates Q1 through Q7 and moving the respective points by these distances calculated.

BRIEF DESCRIPTION OF THE DRAWINGS

FIG. 11 is a flow chart showing operations performed by the embodiment according to the present invention shown in FIG. 1; and FIG. 12 is a flow chart showing operations performed by the embodiment of the present invention shown in FIG. 7.

Throughout the drawings, it is to be noted that components having like numerals or symbols perform like functions.

DETAILED DESCRIPTION OF THE PREFERRED EMBODIMENTS

Figure 1:
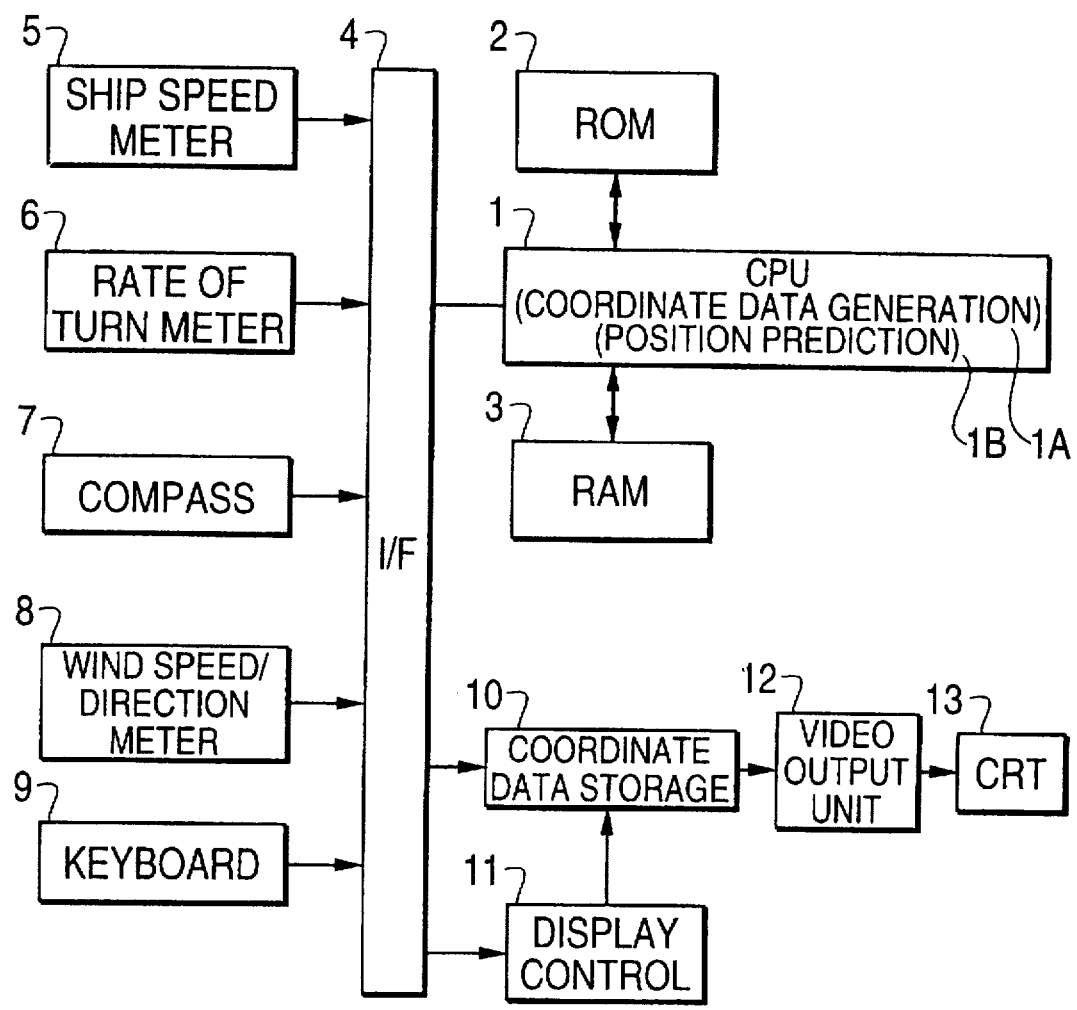
FIG. 1 is a block diagram of an embodiment of a ship maneuvering assistance system according to the present invention.
Figure 2:
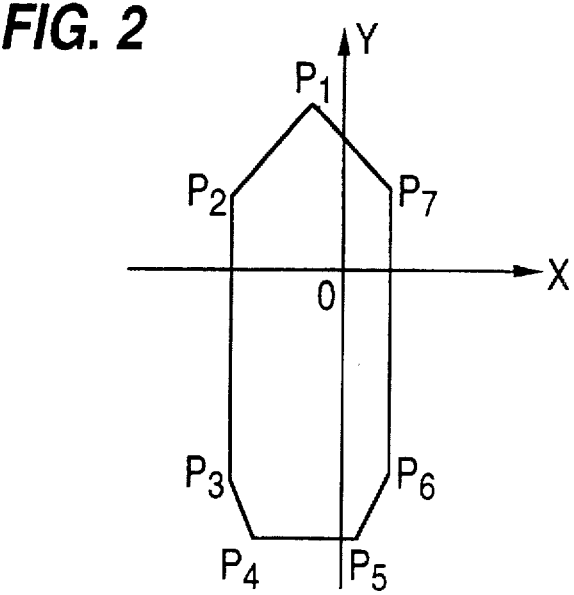
FIG. 2 is a view showing coordinates of points of the hull of the ship.
Figure 3:
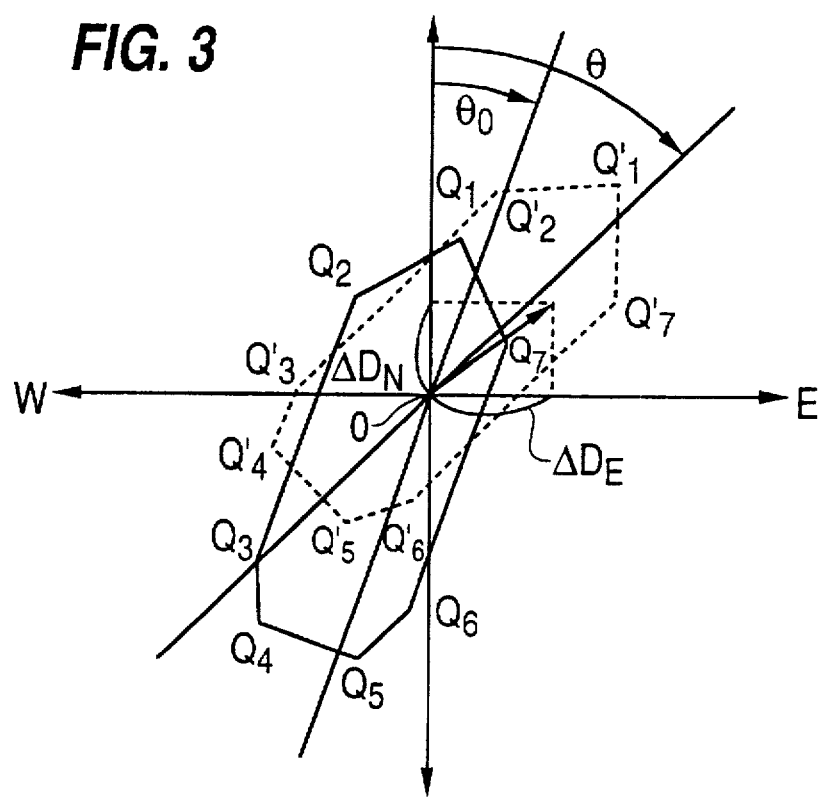
FIG. 3 is a diagram for explaining a coordinates calculation performed when the ship moves.
Figure 4:
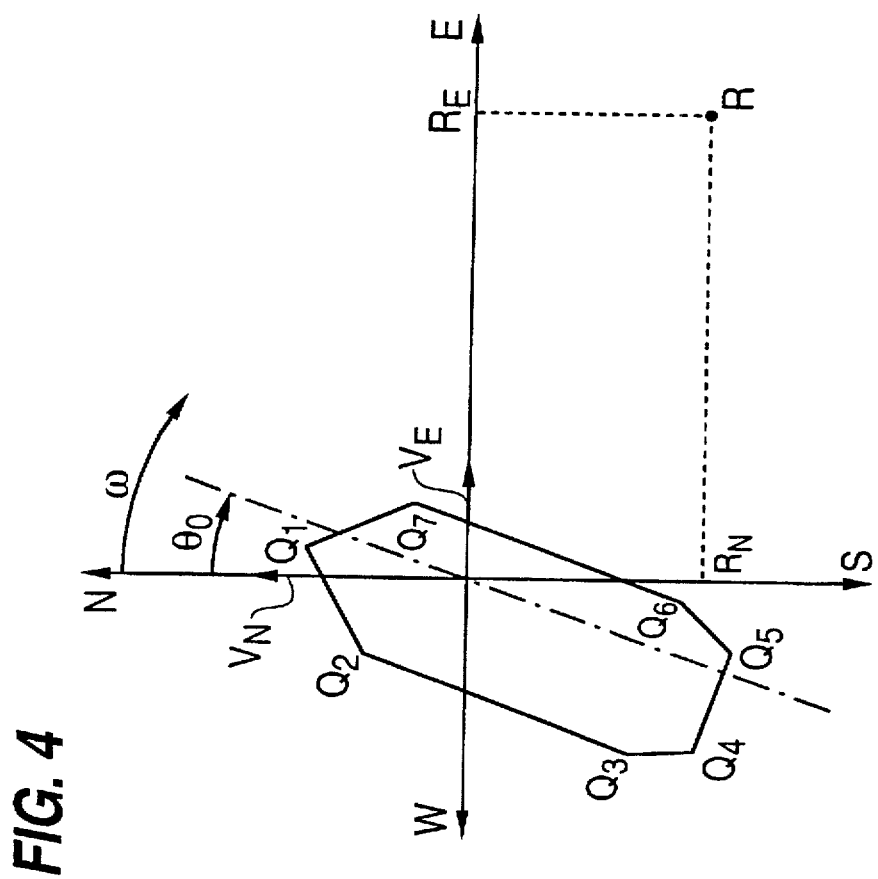
FIG. 4 is a diagram for explaining a coordinates calculation performed when the ship moves.

FIG. 1 is a control block diagram of an embodiment of the navigation support system according to the present invention.

A CPU (central processing unit) 1, which controls the whole of the system, comprises an HD68HC000PS made by Hitachi, Ltd. A ROM (read only memory) 2 comprises an M5M27C402K made by Mitsubishi Electric Corp., and stores programs to be executed by the CPU 1. A RAM (random access memory) 3 comprises an HM66205L made by Hitachi, Ltd. The CPU 1 writes into the RAM 3, data of ship position, heading of the ship, and the like detected by devices and units, which will be explained hereinafter, at a time period, for example every two seconds. The RAM 3 successively stores these data.

Further, the CPU 1 generates coordinates data representing a desired pattern of a ship's hull based on a hull position and a ship's heading read from the RAM 3 in order to display the hull with the pattern. The CPU 1 also computes a predicted position of the hull after a time. based on the present ship speed, heading and the present position of the own ship.

Numeral 4 denotes an interface. The following devices and units are connected to the CPU 1 through the interface 4. Numeral 5 denotes a ship speed meter for detecting the ship's speed relative to the ground or water, which comprises transducer unit DS-330, a transmitting and receiving unit DS-320, and a computation control unit DS-310 of an ultrasonic Doppler sonar DS-30 made by FURUNO ELECTRIC CO., LTD. Numeral 6 denotes a rate of turn indicator for detecting the turning speed of the hull, which comprises a laser gyro DS-340 made by FURUNO. Numeral 7 denotes a compass for detecting heading of the ship, which comprises a gyro compass GY-700 made by FURUNO. Numeral 8 denotes a wind speed/direction meter, which comprises an FW-200 made by FURUNO. Designated by numeral 9 is a keyboard for entering various set data such as hull size and the like. A coordinate data storage unit 10, comprises an MB814400 made by FUJITSU LTD., and stores coordinate data of the pattern produced by the CPU 1. Numeral 11 denotes a display control for reading data necessary for display out of the coordinate data storage unit, and 12 denotes a video output unit for converting the coordinate data read from the coordinate data storage unit 10 into video signals appropriate for displays by a CRT display 13.

First, there will be explained operations for displaying a past track of the own ship, the present position thereof and a future predicted track of the ship with shapes of the ship's hull.

Figure 5:
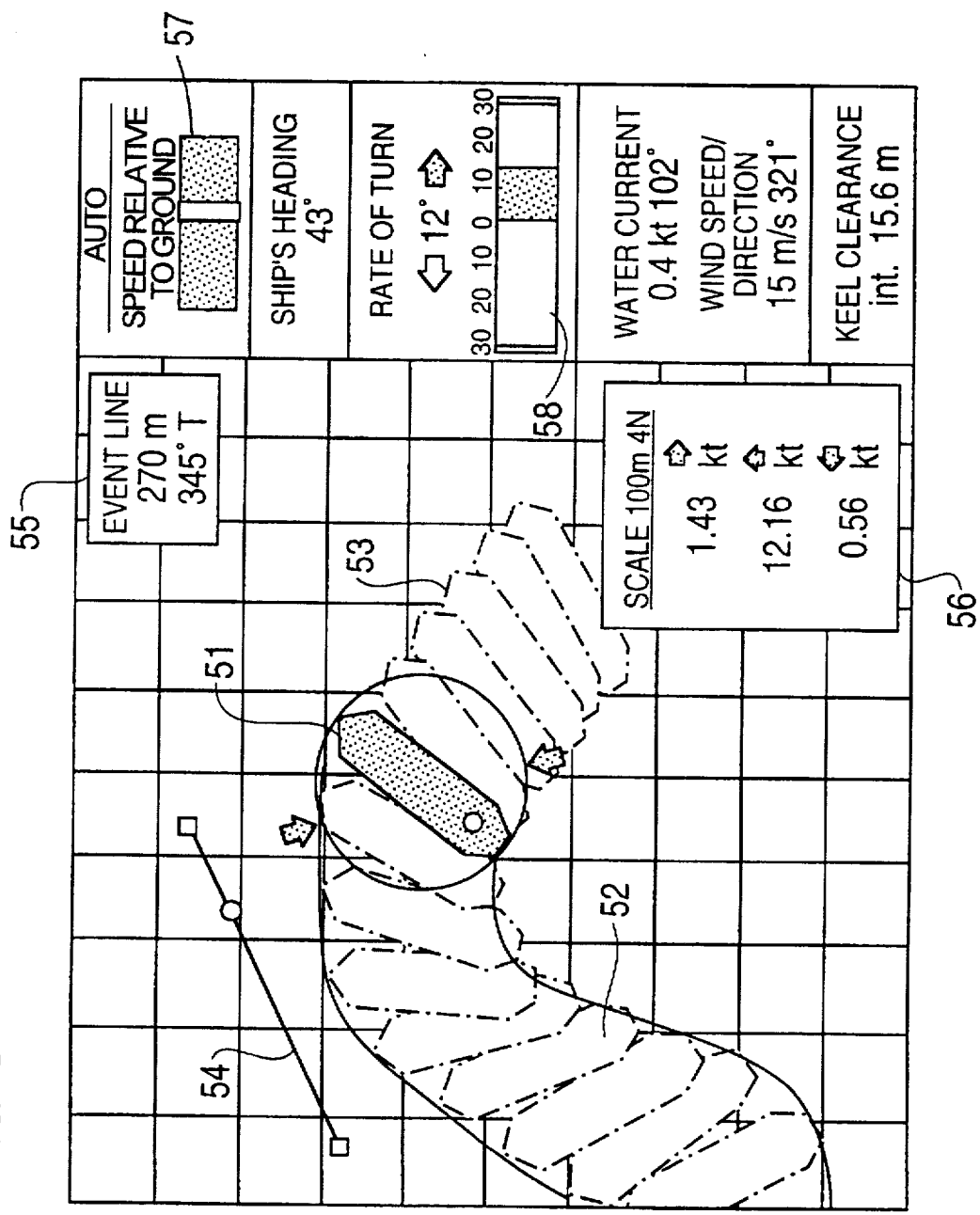
FIG. 5 is a display example presented by the system shown in FIG. 1.

In this case, tracks of the own ship are displayed as shown in FIG. 5. This figure shows a display example in which the north is directed upward on the screen, and background images are fixed. A black-colored part 51 represents the present position of the hull, broken-lined parts 52 on the left side of the present position of the ship represent the hull positions established at a time interval in the past, and broken-lined parts 53 on the right side of the present position of the ship represent predicted future hull positions. Numeral 54 denotes a pier set and entered by the keyboard 9 as an event line.

Figures 9, 10:
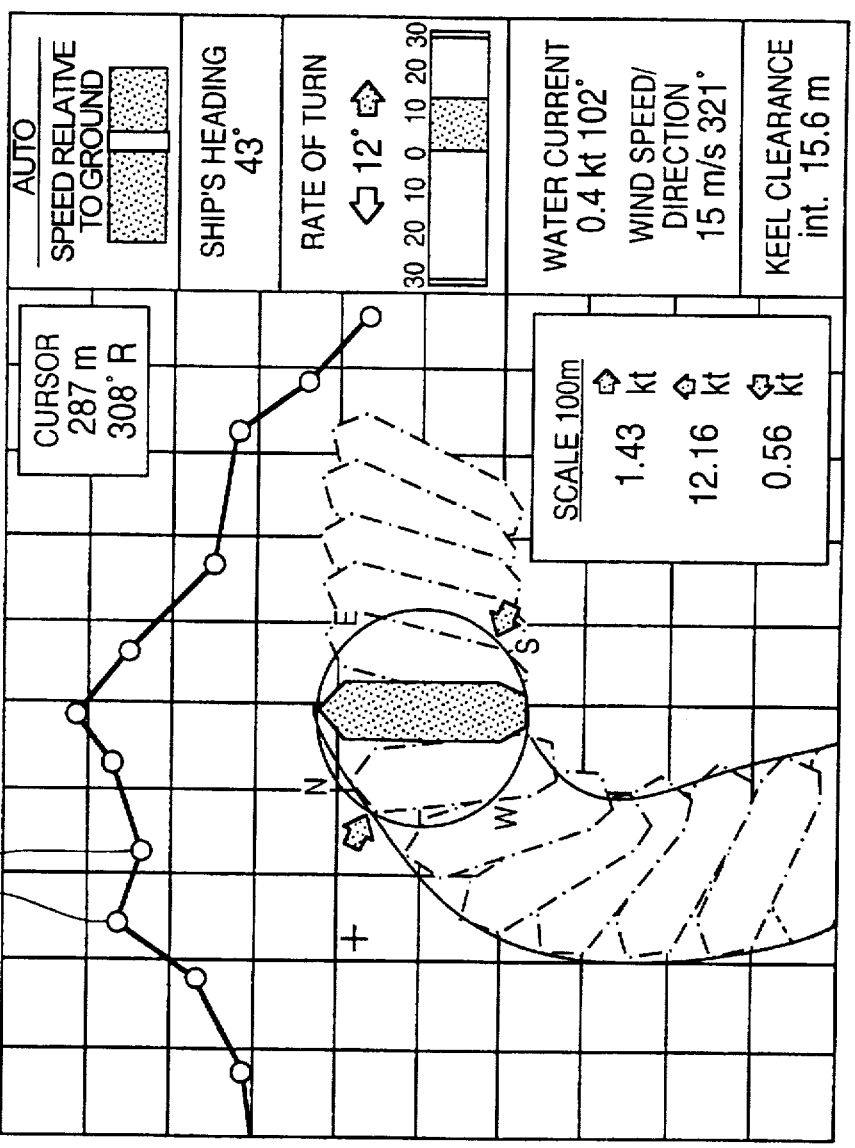
FIG. 9 is a display example presented by the system shown in FIG. 7.
FIG. 10 is a display example presented by a prior art navigation assistance system.

In a frame 55 on an upper right portion of the screen, there are shown the distance from the bridge position (marked by a circle) of the ship to the closest point of the maker line 54 (marked by a circle) and its bearing therebetween. Also, in a frame 56 on a lower right portion of the screen, the same data as in FIG. 10 are displayed.

Further, "GROUND SPEED" at a right end of the screen, indicates that the ship's speed with respect to the ground is being detected, and "AUTO" indicates a mode in which ground-speed signals are used when the ship's speed with respect to the ground can be detected, and water speed signals are automatically used when the ship's speed with respect to the ground can no longer be detected due to occurrences of foams or the like. A bar graph designated by numeral 57 is such that detected echoes have been blacked starting with the right side, the remaining blank part showing that an omission has taken place in the echo reception. Also, a bar graph designated by numeral 58 shows the present rate of turn and its direction.

Figure 6:
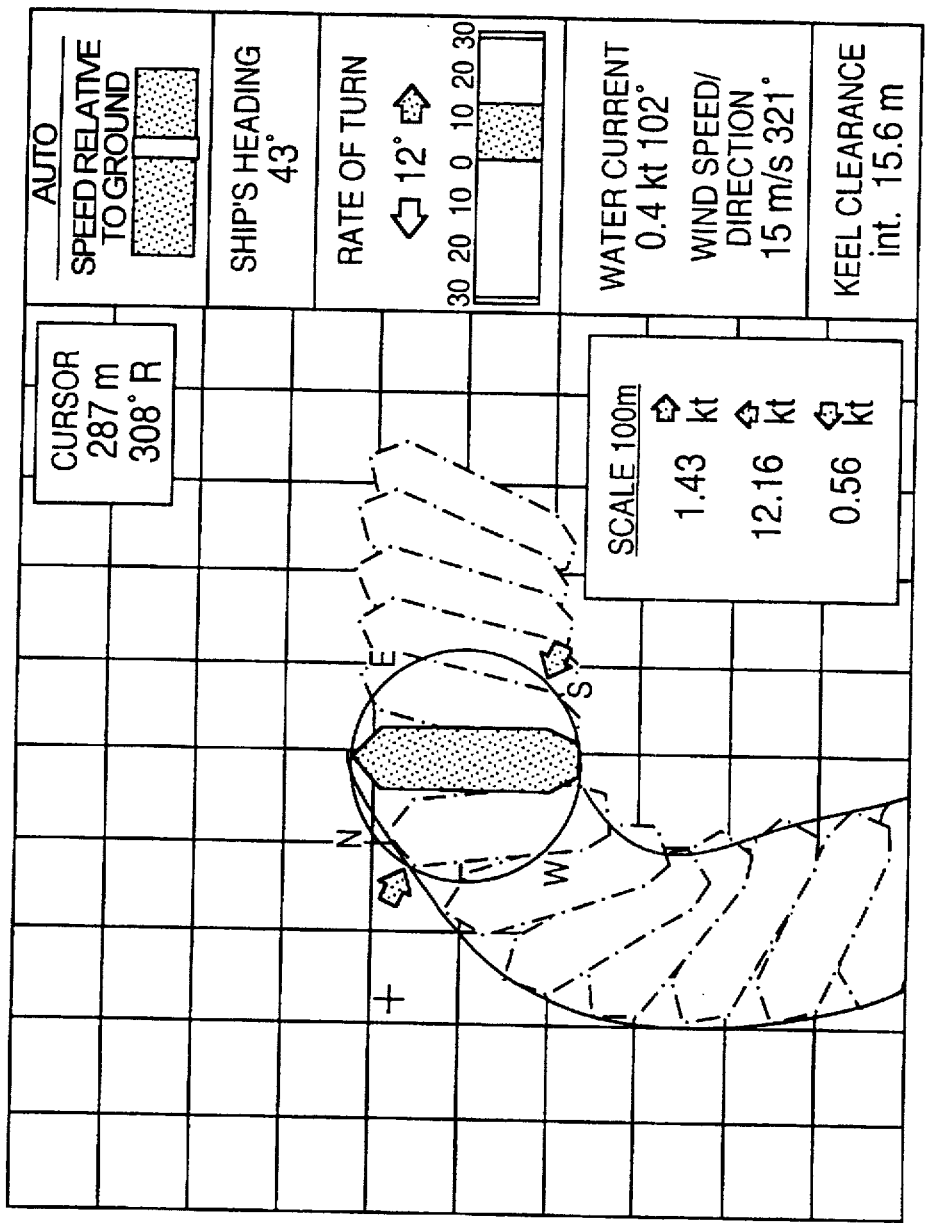
FIG. 6 is a display example presented by the system shown in FIG. 1.

FIG. 6 shows a display example in which the ship's heading is directed upward on the screen, and the own ship is fixedly displayed. In the figure, mark "+" denotes a cursor.

There have been in advance entered by the keyboard 9, data for displaying the size of the hull and the maker line 54, and coordinates of points of the ship's hull P1 through P7 with with respect to the origin O at which a ship speed meter is installed, which have been transmitted to the RAM 3 and stored therein.

Hereinafter, the operation of the embodiment according to the present invention as shown in FIG. 1 will be explained with reference to the flowchart shown in FIG. 11.

At step n1, the CPU 1 extracts ship's ground speed (ship's speed relative to the ground) detected by the speed meter 5 at a period, for example every two seconds, and transmits a signal representing a ship's ground speed via the interface 4 to the RAM 3 to be stored therein. Similarly, rate of turn and heading of the hull detected by the rate of turn indicator 6 and the compass 7 are transmitted at a period via the interface 4 to the RAM 3 to be stored therein.

At step n2, the CPU 1 calculates the distance travelled by a point at which the transmitting and receiving transducer unit of a sensor for detecting the ship's speed, i.e., an ultrasonic Doppler sonar is installed, based on the present ship speed, heading of the ship and a time required for the movement read from the RAM 3. The calculated distance travelled is written into the RAM 3.

At step n3, the CPU 1 calculates the distances over which points P1 through P7 of the hull of the own ship have moved from the preceding time instant to the present time instant. The calculated distances are written into the RAM 3.

At step n4, it is determined whether the rate of turn is zero or not.

If the rate of turn is zero, a calculation of V×Δt is performed at step n5 based on the present ship speed V to thereby obtain a predicted distance to be roved. Thus, new coordinates Q1 through Q7 of the respective points on the hull P1 through P7 are obtained. For example, new coordinates Q1 through Q7 of the points on the hull at five predicted positions in steps of one minute are calculated, such as new coordinates Q1' through Q7' of the hull points at a predicted position one minute after the present time instant, another new set of coordinates Q1' through Q7' of the hull points at another predicted position two minutes after the present time instant, and so on.

At step n8, signals representing the past navigation track, a present ship position and a future predicted track of the own ship in shapes of the hull of the ship are written into memory elements of the coordinate data storage unit 10 having addresses determined by a display scale and with respect to a reference point in the storage unit 10 respectively.

While, if the rate of turn is not zero at step n4, the rotational center of the hull is calculated at step n6.

At step n7, new coordinates Q1' through Q7' of the hull-points are obtained by rotating the coordinates of the hull-points P1 through P7 of the present own ship by an angle of ω×ΔT. For example, new coordinates Q1' through Q7' of the points of the hull at five predicted positions at a time interval of one minute are calculated in such a way that a new set of coordinates Q1' through Q7' of the hull points at a predicted position one minute after the present time instant, another new set of coordinates Q1' through Q7' of the hull points at a predicted position two minutes after the present time instant, and so on.

At step n8, signals representing the past navigation track, a present ship position and a future predicted track of the own ship in shapes of the hull of the ship are written into memory elements of the coordinate data storage unit 10 having addresses determined by a display scale and with respect to a reference point in the storage unit 10 respectively.

The signals read from the coordinate data storage unit 10 are converted into, for example, corresponding color signals in the video output unit 12 and then fed to the CRT indicator 13 to be displayed. As a result, as shown in FIG. 5, it is displayed in such a manner that background images are fixed and the present position of the own ship moves.

Also, at step n8, if signals representing the past navigation track, a present ship position and a future predicted track of the own ship in shapes of the hull of the ship are written into memory elements of the coordinate data storage unit 10 in accordance with a display and as the present position of the ship is at the center of the the storage unit 10, it is displayed in a manner as shown in FIG. 6 that the tracks of the ship are displayed as the present position of the own ship is kept fixed at the center of the screen.

It is to be noted that with the foregoing embodiment, the past navigation track, the present ship position and future predicted track of the own ship have been displayed in shapes of the hull. While, if the present ship position and a future predicted track of the ship are displayed in shapes of a hull, at step n8 in the flowchart of FIG. 11, signals representing the present ship position and future predicted track of the ship with shapes of the hull are written into the coordinate data storage unit 10.

If a past navigation track and present ship position of the own ship are displayed in groups of shapes of the hull, steps n4 through n7 in the flowchart as shown in FIG. 11 are omitted. In this case, at step n8, signals representing the past navigation track and present ship position of the own ship with shapes of the ship's hull are written into the coordinate data storage unit 10.

Figure 7:
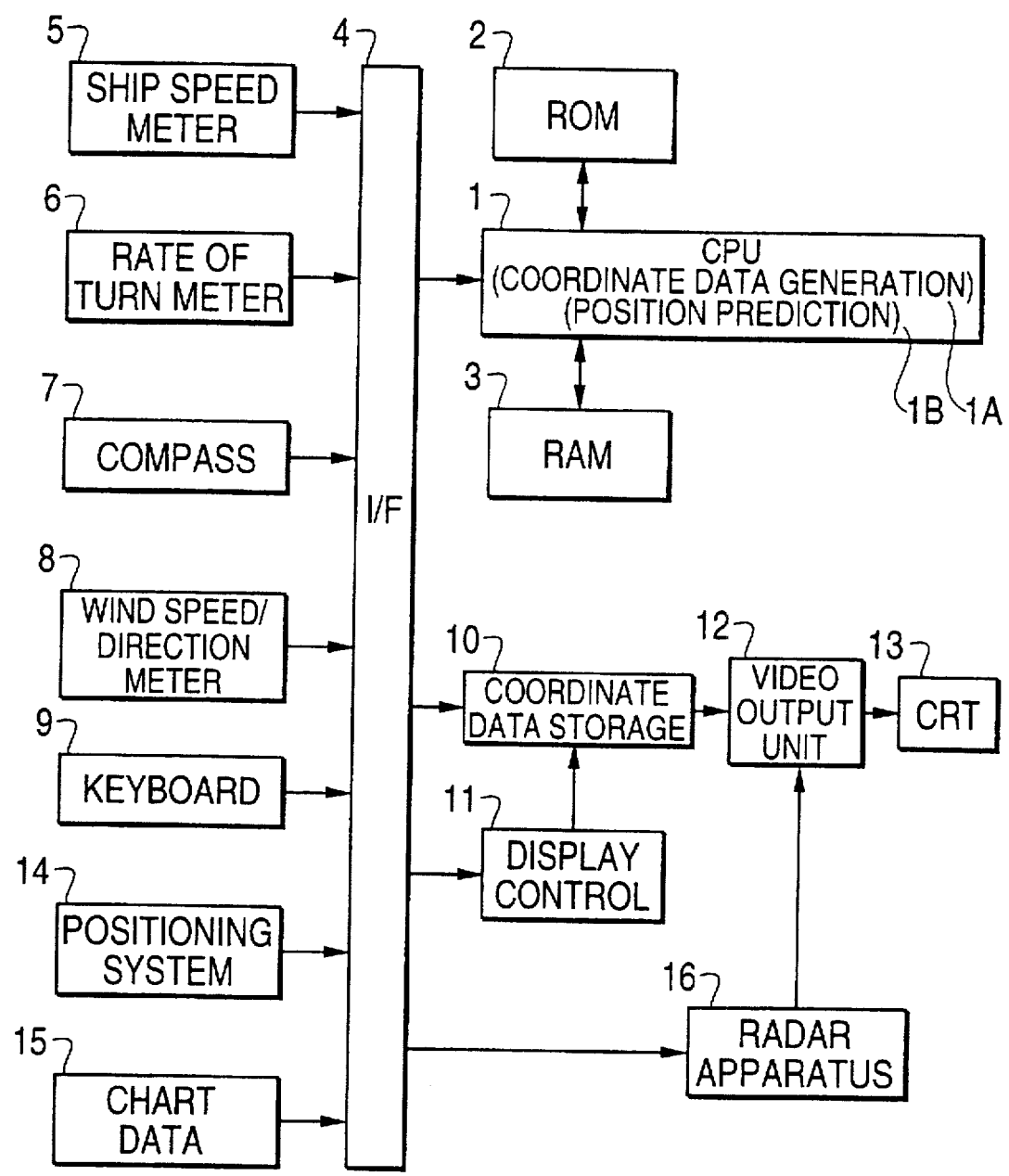
FIG. 7 is a block diagram of another embodiment of the invention in accordance with the present invention.

FIG. 7 is a block diagram of another embodiment according to the present invention.

In FIG. 7, in addition to the devices and units as shown in FIG. 1, there are provided a positioning system 14 for detecting the position of the own ship, a chart data storage unit 15 for storing topographical data such as coastlines, and a radar apparatus 16 for searching surrounding conditions, other ships, and the like around the own ship by radio waves. The positioning system 14 comprises a GPS receiver (Global Positioning System receiver) GP-500 made by FURUNO and produces signals representing the position of the own ship in latitude and longitude. The chart data storage unit 15 comprises an HM66205L made by Hitachi, Ltd. The radar apparatus 16 comprises a radar apparatus FR-1510D made by FURUNO. Display examples presented by this apparatus are given in FIGS. 8 and 9.

It is to be noted that a CPU (central processing unit) 101 comprises an HD68HC000PS made by Hitachi, Ltd., and it controls the whole of the present system.

Hereinafter, there will be explained a case in which the present position of the ship, a past navigation track and a future predicted track of the own ship are displayed with groups of shapes of the ship's hull respectively as superimposed on the earth surface at the same scale, and further radar video signals are displayed as superimposed thereon at the same scale.

Figure 8:
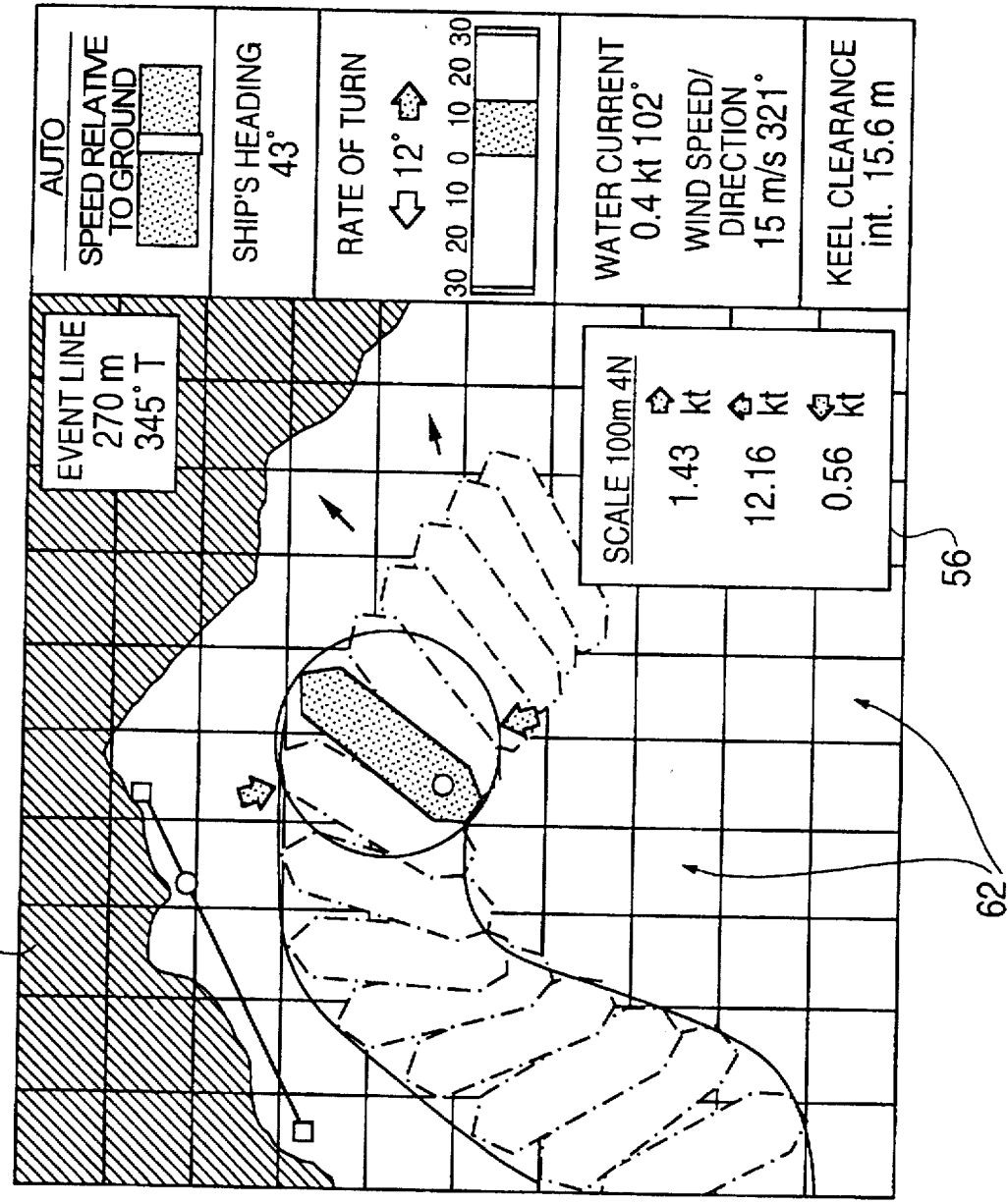
FIG. 8 is a display example presented by the system shown in FIG. 7.

FIG. 8 illustrates a display example in which the images of a lands and other ships caught by the radar apparatus 16 are displayed in addition to those of the display example shown in FIG. 5 where the north is in an upward direction. Hatched part 61 and small dots 62 represent images of a land and other ships, respectively, caught by the radar apparatus 16. In this case, the search range of the radar apparatus 16 is set so that the original display and the radar images coincide with each other in terms of display scale, and further the display mode of the radar apparatus 16 is set to a "true motion mode (the own ship moves over the screen with background images such as lands and the like are fixed)".

It is to be noted that radar video may also be displayed as superimposed on the display as shown in FIG. 6, where the ship's heading is in an upward direction.

FIG. 9 illustrates an example in which topographical data read from the chart data storage 15 unit are displayed, where respective blank circles 71 represent the topographical points read from the chart data storage unit 15. It is to be noted that although radar images and topographical data produced by the chart data storage unit 15 are displayed in the foregoing, both of them can also be displayed together in one display as superimposed one on another.

The operation of the embodiment according to the present invention shown in FIG. 7 will be explained with reference to the flowchart shown in FIG. 12.

At step n1, the CPU 101 extracts ship's ground speed (ship's speed relative to the ground) detected by the speed meter 5 at a period, for example every two seconds, and transmits a signal representing a ship's ground speed via the interface 4 to the RAM 3 to be stored therein. Similarly, rate of turn and heading of the hull detected by the rate of turn indicator 6 and the compass 7 are transmitted at a period via the interface 4 to the RAM 3 to be stored therein.

At step n2, the CPU 101 calculates the distance travelled by a point at which the transmitting and receiving transducer unit of a sensor for detecting the ship's speed, i.e., an ultrasonic Doppler sonar is installed, based on the present ship speed, heading of the ship and a time required for the movement read from the RAM 3. The . calculated distance travelled is written into the RAM 3.

At step n3, the CPU 101 calculates the distances over which points P1 through P7 of the hull of the own ship have moved from the preceding time instant to the present time instant. The calculated distances are written into the RAM 3.

At step n4, it is determined whether the rate of turn is zero or not.

If the rate of turn is zero, a calculation of V×Δt is performed at step n5 based on the present ship speed V to thereby obtain a predicted distance to be moved. Thus, new coordinates Q1 through Q7 of the respective points on the hull P1 through P7 are obtained. For example, new coordinates Q1 through Q7 of the points on the hull at five predicted positions in steps of one minute are calculated, such as new coordinates Q1' through Q7' of the hull points at a predicted position one minute after the present time instant, another new set of coordinates Q1' through Q7' of the hull points at another predicted position two minutes after the present time instant, and so on.

At step n8, the CPU 101 extracts own ship position information representing the position of the own ship from the positioning system 14, and writes it into the RAM 3 to be stored therein.

At step n9, a signal representing a display range is entered from the keyboard 9.

At step n10, the signal representing the display range is transmitted to the radar apparatus 16.

At step n11, there is determined an area on the earth to be displayed on the screen of the indicator 13.

At step n12, topographical data are read from the chart data storage unit 15 and entered.

At step n13, there are written into memory elements having corresponding addresses of the coordinate data storage unit 10 signals representing a past navigation track, a present position, and a future predicted track of the own ship in groups of shapes of the ship's hull and data representing land forms such as piers in compliance with the screen display area on the indicator 13. The addresses of the memory elements are determined with respect to a reference point in the coordinate data storage unit 10.

While, if the rate of turn is not zero at step n4, the rotational center of the hull is calculated at step n6.

At step n7, new coordinates Q1' through Q7' of the hull-points are obtained by rotating the coordinates of the hull-points P1 through P7 of the present own ship by an angle of $\omega \times \Delta T$. For example, new coordinates Q1' through Q7' of the points of the hull at five predicted positions at a time interval of one minute are calculated in such a way that a new set of coordinates Q1' through Q7' of the hull points at a predicted position one minute after the present time instant, another new set of coordinates Q1' through Q7' of the hull points at a predicted position two minutes after the present time instant, and so on.

At step n8, the CPU 101 extracts own ship position information representing the position of the own ship from the positioning system 14, and writes it into the RAM 3 to be stored therein.

At step n9, a signal representing a display range is entered from the keyboard 9.

At step n10, the signal representing the display range is transmitted to the radar apparatus 16.

At step n11, there is determined an area on the earth to be displayed on the screen of the indicator 13.

At step n12, topographical data are read from the chart data storage unit 15 and entered.

At step n13, there are written into memory elements having corresponding addresses of the coordinate data storage unit 10 signals representing a past navigation track, a present position, and a future predicted track of the own ship in groups of shapes of the ship's hull and data representing land forms such as piers in compliance with the screen display area on the indicator 13. The addresses of the memory elements are determined with respect to a reference point in the coordinate data storage unit 10.

The signals read from the coordinate data storage unit 10 are converted into, for example, corresponding color signals in the video output unit 12 and then fed to the CRT indicator 13 to be displayed. Radar image signals in accordance with a "true motion" display mode are supplied from the radar apparatus 16 through the video output unit 12 to the indicator 13 to be displayed as superimposed on ship's tracks. As a result, it is displayed in a manner that background images are fixed and the present position of the ship moves.

Also, at step n13, there are written into the coordinate data storage unit 10, signals representing a past navigation track, a present position, and a future predicted track of the own ship in groups of shapes of the ship's hull and data representing land forms such as piers in compliance with the screen display area on the indicator 13, with the present position of the ship at its center. Radar image signals in accordance with a "course up" display mode are supplied from the radar apparatus 16 through the video output unit 12 to the indicator 13 to be displayed as superimposed on ship's tracks. As a result, it is displayed in a manner that the present position of the ship is fixed on the screen, as shown in FIG. 9.

It is to be noted that with the embodiments shown in FIGS. 7 and 12, there are displayed ship's tracks, a chart representing lands or islands and radar images as superimposed one on the other. It is also possible to display ship's tracks and a chart representing lands or islands. In this case, step n10 in the flowchart shown in FIG. 12 is omitted. Further, there can be displayed ship's tracks and radar images superimposed one on another. In this case, step n12 in the flowchart shown in FIG. 12 is omitted, and at step n13, there are written into the coordinate data storage unit 10 signals representing a past track of the own ship, the present position and a future predicted track of the ship in shapes of the ship's hull.

It is to be noted that with the embodiments shown in FIGS. 7 and 12, in addition to the arrangements that a past navigation track, a present ship position, and a future predicted track of the own ship are represented in shapes of the hull, there can also be displayed the present ship position and a future predicted track in the shapes of the hull, or a past navigation trace and a present ship position of the own ship.

Although with the foregoing embodiments, the navigation trace of the ship has been displayed in a pattern of groups of shapes of a ship, the ship may alternatively be represented in another pattern of circles or rectangles.

Although with the above embodiments the speed meter 5 comprises an ultrasonic Doppler sonar, without being limited to this apparatus, it may comprise a GPS (Global Positioning System) receiver. Besides, it is also possible to first measure the position of the own ship at two points by a navigational aid device such as a loran receiver and to calculate the distance between the two points. Then, a ship's speed can be calculated based on the calculated distance and a time required to travel the distance.

EFFECTS PRODUCED BY THE INVENTION

As described in the foregoing, according to the present invention, movements of a ship's hull can be grasped precisely, since the position of points of the hull is detected at a time interval and a ship's past navigation track as well as its present position are displayed on an indicator. Further, by displaying a predicted position of the ship after a specified time elapses from the present moment as well, precise or correct navigation instructions can be issued without relying on human judgements or assumptions. Moreover, surrounding conditions around the ship can be grasped more precisely and more appropriate navigation support information can be obtained, by displaying radar images and land form data as superimposed thereon.

We claim:

1. A display system comprising:

speed detection means for detecting speed of a moving body;

bearing detection means for detecting a bearing of the moving body with respect to a reference bearing;

rate of turn measuring means for detecting a turning speed of the moving body;

coordinate-data generating means for generating coordinate data representing a present position and bearing of said moving body based at least on the speed of said moving body detected by said speed detection means and the bearing of said moving body detected by said bearing detection means, and a future predicted position and bearing based at least on said present position and bearing and the turning speed of said moving body detected by said rate of turn measuring means;

coordinate data storing means for sequentially storing the coordinate data representing at least the present position and bearing of said moving body to obtain past position and bearing of said moving body;

environment image generating means for generating an image representative of an environment through which said moving body maneuvers; and an indicator for simultaneously displaying a first graphical figure representing a shape of said moving body indicative of the present position and bearing of the moving body, a second graphical figure representing the shape of said moving body indicative of the past position and bearing of the moving body in relation to the present position and bearing of the moving body, and a third graphical figure representing the shape of said moving body indicative of the future predicted position and bearing of the moving body in relation to the present position and bearing of the moving body, and said generated image, a size of said first second, and third graphical figures being scaled approximately to a display of said generated image.

2. The display system as claimed in claim 1, wherein the speed detection means for detecting the speed of the moving body comprises a Doppler sonar.

3. The display system as claimed in claim 1, wherein the speed detection means for detecting the speed of the moving body comprises a GPS receiver.

4. The display system of claim 1 further comprising:

storing means for successively storing speed of said moving body detected by said speed detection means and bearing of said moving body detected by said bearing detection means.

5. The display system of claim 1, wherein said coordinate-data storing means further storing the coordinate data representing the future predicted position and bearing of said moving body.

6. A display system comprising:

speed detection means for detecting speed of a moving body;

bearing detection means for detecting a bearing of the moving body with respect to a reference bearing;

rate of turn measuring means for detecting a rate of turn of the moving body;

coordinate-data generating means for generating coordinate data every predetermined period of time representing a future predicted position and bearing based on the speed of said moving body detected by said speed detection means, the bearing of said moving body detected by said bearing detection means and the turning speed of said moving body detected by said rate of turn measuring means;

environment image generating means for generating an image representative of an environment through which said moving body maneuvers; and an indicator for simultaneously displaying a plurality of graphical figures representing a shape of said moving body respectively indicative of the future predicted position and bearing of the moving body based on the coordinate-data, and said generated image, a size of said plurality of graphical figures being scaled approximately to a display of said generated image.

7. The display system of claim 6 further comprising:

coordinate-data storing means for storing the coordinate data representing said future predicted position and bearing.

8. A display system of claim 6, wherein said graphical figures represent an approximation of the shape of said moving body.

9. A display system of claim 8, wherein said environment, image generating means comprises:

a land form generating means for generating land forms representative of an environment through which said moving body maneuvers.

10. A display system comprising:

speed detection means for detecting speed of a ship;

bearing detection means for detecting a bearing of the ship with respect to a reference bearing;

rate of turn measuring means for detecting a turning speed of the ship;

ship's hull point storing means for storing signals representing a plurality of points of the ship's hull;

coordinate-data generating means for generating coordinate data representing a present position and bearing of said ship's hull based at least on the speed of said ship detected by said speed detection means, the bearing of said ship detected by said bearing detection means and said plurality of points of the ship's hull stored in said ship's hull point storing means, and a future predicted position and bearing of said ship's hull based at least on said present position and bearing and the turning speed of said ship detected by said rate of turn measuring means;

coordinate-data storing means for sequentially storing the coordinate data representing at least said present position and bearing of said ship's hull to obtain past position and bearing of said ship's hull; and an indicator for simultaneously displaying a first graphical figure representing said ship's hull indicative of the present position and bearing of the ship's hull, a second graphical figure representing said ship's hull indicative of the past position and bearing of the ship's hull in relation to the present position and bearing of the ship' hull, and a third graphical figure representing said ship' hull indicative of the future predicted position and bearing of the ship's hull in relation to the present position and bearing of the ship's hull.

11. The display system of claim 10 further comprising:

storing means for successively storing speed of said ship detected by said speed detection means and bearing of said moving body detected by said bearing detection means.

12. The display system of claim 10, wherein said coordinate-data storing means further storing the coordinate data representing the future predicted position and bearing of said moving body.

13. The display system of claim 10, wherein the speed detection means for detecting the speed of the ship comprises a Doppler sonar.

14. The display system of claim 10, wherein the speed detection means for detecting the speed of the ship comprises a GPS receiver.

15. A display system comprising:

speed detection means for detecting speed of a ship;

bearing detection means for detecting a bearing of the ship with respect to a reference bearing;

rate of turn measuring means for detecting a rate of turn of the ship;

ship's hull point storing means for storing signals representing a plurality of points of the ship's hull;

coordinate-data generating means for generating coordinate data every predetermined period of time representing a future predicted position and bearing of said ship's hull based on the speed of said ship detected by said speed detection means, the bearing of said ship detected by said bearing detection means the turning speed of said ship detected by said rate of turn measuring means, and said plurality of points of the ship's hull stored in said ship's hull point storing means; and an indicator for simultaneously displaying a plurality of graphical figures representing said ship's hull respectively indicative of the future predicted position and bearing of the ship's hull based on the coordinate-data.

16. The display system of claim 15 further comprising:

coordinate-data storing means for storing the coordinate data representing said future predicted position and bearing.

17. A display system comprising:

speed detection means for detecting speed of a ship;

bearing detection means for detecting a bearing of said ship with respect to a reference bearing;

hull point storing means for storing signals representing a plurality of points of a hull of said ship;

coordinate-data generating means for generating coordinate data representing a present position and bearing of said hull based on said speed of said ship detected by said speed detection means, said bearing of said ship detected by said bearing detection means, and said plurality of points of said hull stored in said hull point storing means; and coordinate-data storing means for sequentially storing said coordinate data representing said present position and bearing of said hull to obtain past position and bearing of said hull; and an indicator for simultaneously displaying a plurality of graphical figures representing said hull respectively indicative of said past position and bearing of the hull based on data stored in said coordinate-data storing means.

18. The display system of claim 17 further comprising:

storing means for successively storing speed of said ship detected by said speed detection means and bearing of said ship detected by said bearing detection means.

19. A ship maneuvering assistance system comprising:

speed detection means for detecting speed of a ship;

bearing detection means for detecting a bearing of the ship with respect to a reference bearing;

rate of turn measuring means for detecting rate of turn of the ship;

ship's hull point storing means for storing signals representing a plurality of points of the ship's hull;

coordinate-data generating means for generating coordinate data representing a present position and bearing of said ship's hull based at least on the speed of said ship detected by said speed detection means, the bearing of said ship detected by said bearing detection means and said plurality of points of the ship's hull stored in said ship's hull point storing means, and a future predicted position and bearing of said ship's hull based at least on said present position and bearing, and the turning speed of said ship detected by said rate of turn measuring means;

land form storing means for storing signals representing land forms such as lands or islands;

coordinate-data storing means for sequentially storing the coordinate data representing at least said present position and bearing of the ship's hull to obtain past position and bearing of the ship's hull and the signals representing land forms read out from said land form storing means; and an indicator for simultaneously displaying a first graphical figure representing the ship's hull indicative of the present position and bearing of the ship's hull, a second graphical figure representing the ship's hull indicative of the past position and bearing of the ship's hull in relation to the present position and bearing of the ship's hull, a third graphical figure representing the ship's hull indicative of the future predicted position and bearing of the ship's hull in relation to the present position and bearing of the ship's hull, and a figure representing the land forms in relation to the present position and bearing of the ship's hull based on signals stored in said land form storing means.

20. The ship maneuvering assistance system as claimed in claim 19, wherein the speed detection means for detecting the speed of the ship comprises a GPS receiver.

21. The display system of claim 19, wherein said coordinate-data storing means further storing the coordinate data representing the future predicted position and bearing of said moving body.

22. The ship maneuvering assistance system of claim 19, wherein the speed detection means for detecting the speed of the ship comprises a Doppler sonar.

23. A navigation assistance system comprising:

speed detection means for detecting the speed of a ship;

bearing detection means for detecting a bearing of the ship with respect to a reference bearing;

rate of turn measuring means for detecting a turning speed of the ship;

ship's hull point storing means for storing signals representing a plurality of points of the ship's hull;

coordinate-data generating means for generating coordinate data every predetermined period of time representing a future predicted position and bearing of the ship's hull based on the speed of said ship detected by said speed detection means, the bearing of said ship detected by said bearing detection means, the turning speed of said ship detected by said rate of turn measuring means and said plurality of points of the ship's hull stored in said ship's hull point storing means; and land form storing means for storing signals representing land forms such as lands or islands; and an indicator for simultaneously displaying graphical figures representing the ship's hull respectively indicative of the future predicted position and bearing of the ship's hull based on the coordinate-data, and a figure representing the land forms in relation to the future predicted position and bearing of the ship based on signals stored in said land form storing means.

24. The display system of claim 23, further comprising coordinate-data storing means for storing the coordinate data representing said future predicted position and bearing.

25. A navigation assistance system comprising:

speed detection means for detecting a speed of a ship;

bearing detection means for detecting a bearing of said ship with respect to a reference bearing;

storing means for successively storing said speed output from said speed detection means and said bearing output from said bearing detection means;

hull point storing means for storing signals representing a plurality of points of a hull of said ship;

coordinate-data generating means for generating coordinate data representing a present position and bearing of said hull based on said speed and said bearing of said ship output from said storing means, and a plurality of points of said hull stored in said hull point storing means; and coordinate-data storing means for sequentially storing said coordinate data representing said present position and bearing of said hull to obtain past position and bearing of said hull; and an indicator for simultaneously displaying a plurality of graphical figures representing said hull respectively indicative of said past position and bearing of said hull based on data stored in said coordinate-data storing means.

26. A display system comprising:

speed detection means for detecting speed of a ship;

bearing detection means for detecting a bearing of the ship with respect to a reference bearing;

rate of turn measuring means for detecting turning speed of the ship;

coordinate-data generating means for generating coordinate data representing a present position and bearing of said ship based at least on the speed of said ship detected by said speed detection means, the bearing of said ship detected by said bearing detection means and a future predicted position and bearing of said ship based at least on said present position and bearing, and the turning speed of said ship detected by said rate of turn measuring means;

coordinate-data storing means for sequentially storing the coordinate data representing at least the present position and bearing of said ship to obtain past position and bearing;

radar signal supply means for supplying radar image signals representative of an environment through which said ship maneuvers; and an indicator for simultaneously displaying a first graphical figure representing a shape of said ship indicative of the present position and bearing of the ship, a second graphical figure representing the shape of said ship indicative of the past position and bearing in relation to the present position and bearing of the ship, a third graphical figure representing the shape of said ship indicative of the future predicted position and bearing in relation to the present position and bearing of the ship, and a radar image in accordance with the radar image signals supplied from said radar signal supply means, a size of said first, second, and third graphical figures being scaled approximately to a display of said radar image.

27. The display system of claim 26 further comprising:

storing means for successively storing speed of said ship detected by said speed detection means and bearing of said ship detected by said bearing detection means.

28. The display system of claim 26, wherein said coordinate-data storing means further storing the coordinate data representing the future predicted position and bearing of said moving body.

29. The display system of claim 26, wherein the speed detection means for detecting the speed of the ship comprises a Doppler sonar.

30. The display system of claim 26, wherein the speed detection means for detecting the speed of the ship comprises a GPS receiver.

31. A display system comprising:

speed detection means for detecting speed of a ship;

bearing detection means for detecting a bearing of the ship with respect to a reference bearing;

rate of turn measuring means for detecting turning speed of the ship;

coordinate-data generating means for generating coordinate data every predetermined period of time representing a future predicted position and bearing of said ship based on the speed of said ship detected by said speed detection means, and the bearing of said ship detected by said bearing detection means and the turning speed of said ship detected by said rate of turn measuring means;

radar signal supply means for supplying radar image signals representative of an environment through which said ship maneuvers; and an indicator for simultaneously displaying a plurality of graphical figures representing a shape of said ship respectively indicative of the future predicted position and bearing of the ship based on the coordinate data, and a radar image in accordance with the radar image signals supplied from said radar signal supply means, a size of said plurality of graphical figures being scaled approximately to a display of said radar image.

32. A display system of claim 31, wherein said graphical figures represent an approximation of the shape of a hull of said ship.

33. The display system of claim 31, further comprising:

coordinate-data storing means for storing the coordinate data representing said future predicted position and bearing.

34. A display system comprising:

speed detection means for detecting speed of a ship;

bearing detection means for detecting a bearing of said ship with respect to a reference bearing;

hull point storing means for storing signals representing a plurality of points of a hull of said ship;

coordinate-data generating means for generating coordinate data representing a present position and bearing of said hull based on the speed of said ship detected by said speed detection means, said bearing of said ship detected by said bearing detection means, and said plurality of points of said hull stored in said hull point storing means;

coordinate-data storing means for sequentially storing said coordinate data representing said present position and bearing of said hull to obtain past position and bearing of said hull;

radar signal supply means for supplying radar image signals; and an indicator for simultaneously displaying a plurality of graphical figures representing said hull respectively indicative of said past position and bearing of said hull based on data stored in said coordinate-data storing means, and a radar image in accordance with the radar image signals supplied from said radar signal supply means.

35. The display system of claim 34 further comprising:

storing means for successively storing speed of said ship detected by said speed detection means and bearing of said ship detected by said bearing detection means.

36. A display system comprising:

position detection means for detecting a present position of a moving body;

bearing detection means for detecting a bearing of the moving body with respect to a reference bearing;

17 rate of turn measuring means for detecting a turning speed of the moving body;

coordinate-data generating means for generating coordinate data representing a present position and bearing of said moving body based at least on the position of the moving body detected by said position detection means and the bearing of said moving body detected by said bearing detection means, and a future predicted position and bearing based at least on said present position and bearing and the turning speed of said moving body detected by said rate of turn measuring means;

coordinate data-storing means for sequentially storing the coordinate data representing at least the present position and bearing of said moving body to obtain past position and bearing of said moving body;

environment image generating means for generating an image representative of an environment through which said moving body maneuvers; and an indicator for simultaneously displaying a first graphical figure representing a shape of said moving body indicative of the present position and bearing of the moving body, a second graphical figure representing the shape of said moving body indicative of the past position and bearing of the moving body in relation to the present position and bearing of the moving body, and a third graphical figure representing the shape of said moving body indicative of the future predicted position and bearing of the moving body in relation to the present position and bearing of the moving body, and said generated images, a size of said first second, and third graphical figures being scaled approximately to a display of said generated image.

37. The display system of claim 36, wherein said position detection means includes a Global Positioning System receiver.

38. A display system of claim 36, wherein said first, second, and third graphical figures represent an approximation of the shape of a hull of said moving body.

39. A display system of claim 38, wherein said environment image generating means comprises:

a land form generating means for generating land forms representative of an environment through which said moving body maneuvers.

40. A ship maneuvering assistance system comprising:

measuring means for measuring movements of a ship;

generating means for generating signals representing a present position and bearing of said ship, a past position and bearing of said ship, and a future predicted position and bearing of said ship based on said movements measured by said measuring means;

environment image generating means for generating an image representative of an environment through which said moving ship maneuvers; and an indicator for simultaneously displaying a first graphical figure representing an approximation of a shape of a hull of said ship and indicative of said present position and bearing of said ship, a second graphical figure representing the approximation of said shape of the hull of said ship and indicative of said past position and bearing of said ship in relation to said present position and bearing of said ship, and a third graphical figure representing the approximation of said shape of the hull of said ship and indicative of said future predicted position and bearing of said ship in relation to said present position and bearing of said ship, and said generated image, a size of said first, second, and third graphical figures being scaled approximately to a display of said generate image.

41. A ship maneuvering assistance system of claim 40, wherein said first, second and third graphical figures further indicate pointing direction of a bow of said ship at said present position and bearing, past position and bearing, and future predicted position and bearing, respectively.

42. A ship maneuvering assistance system of claim 40, wherein said measuring means further includes, speed detection means for detecting speed of said ship, and bearing detection means for detecting said bearing of said ship with respect to a reference bearing, and wherein said movements of said ship are measured by said speed detection means and said bearing detection means.

43. A ship maneuvering assistance system of claim 40, wherein said environment image generating means comprises:

land form storing means for storing signals representing land forms representative of an environment through which said ship maneuvers; and wherein said indicator also simultaneously displays said land forms in relation to said present, past, and future predicted positions and bearings of said ship, said first, second, and third graphical figures being superimposed with and scaled to said displayed land forms.

44. A ship maneuvering assistance system of claim 40, wherein said environment image generating means comprises:

radar signal supply means for supplying radar image signals representative of an environment through which said ship maneuvers; and wherein said indicator also simultaneously displays said radar image in relation to said present, past, and future predicted positions and bearings of said ship, said first, second, and third graphical figures being superimposed with and scaled to said displayed radar image.

45. A ship maneuvering assistance system of claim 40, wherein said measuring means further includes, rate of turn measuring means for detecting a turning speed of said ship to measure rotational movements of said ship.

46. A ship maneuvering assistance system of claim 45, wherein said measuring means comprises, first calculating means for calculating directional relationship of at least two separate points of said ship based on said rotational movements of said ship.

47. A ship maneuvering assistance system of claim 46, wherein said generating means comprises, second calculating means for calculating said directional relationship at said present position, said directional relationship at said past position of said ship, and said directional relationship at said future predicted position of said ship.

48. A ship maneuvering assistance system of claim 44, wherein said graphical figures further indicate said directional relationship.

49. A ship maneuvering assistance system comprising rotational movement detecting means for detecting a rotational movement of a ship;

directional relationship establishing means for establishing a directional relationship of at least two separate points of said ship based on a detected said rotational movement of said ship;

position and bearing calculating means for calculating a present position and bearing of said ship, and at least one future position and bearing of said ship based on said present position and bearing and said detected rotational movement of said ship;

environment image generating means for generating an image representative of an environment through which said ship maneuvers;

an indicator for simultaneously displaying said present and future positions, said directional relationship at respective positions calculated by said position and bearing calculating means, and said generated image.

50. A ship maneuvering assistance system of claim 49, wherein said indicator displays said directional relationship using a graphical figure representing a shape of said ship.

51. A ship maneuvering assistance system of claim 49, further comprising:

speed detection means for detecting speed of said ship; and bearing detection means for detecting said bearing of said ship with respect to a reference bearing; wherein said directional movements are measured by said speed detection means and said bearing detection means.

52. A ship maneuvering assistance system of claim 49, wherein said rotational movement detecting means detects a turning speed of said ship.

53. A ship maneuvering assistance system of claim 49, further comprising:

ship's hull point storing means for storing said at least two separate points of said ship.

54. A ship maneuvering assistance system of claim 49, wherein said environment image generating means comprises:

land form storing means for storing signals representing land forms; and wherein said indicator also simultaneously displays said land forms in relation to said present position and directional relationship and said at least one future position and directional relationship of said ship.

55. A ship maneuvering assistance system of claim 49, wherein said environment image generating means comprises:

radar signal supply means for supplying radar image signals; and wherein said indicator also simultaneously displays a radar image based on said radar images signals in relation to said present position and directional relationship and said at least one future position and directional relationship of said ship.

56. A ship maneuvering assistance system of claim 49, wherein said position and bearing calculating means calculates at least one past position and bearing of said ship and wherein, said indicator displays said past position and said directional relationship at said past position.

57. A ship maneuvering assistance system comprising:

direction detecting means for detecting a moving direction of a ship;

rotation detecting means for detecting a rotational movement of said ship;

speed detection means for detecting a moving velocity of said ship;

environment image generating means for generating an image representative of an environment through which said moving body maneuvers; and an indicator displaying a first area being swept by said ship and a second area presumed to be a future area swept by said ship in relation to said first area based on said detected moving direction, said detected rotational movement, and said detected moving velocity of said ship, and said generated image, a size of said first and second areas being scaled approximately to a display of said generated image.

58. A ship maneuvering assistance system of claim 57, wherein said rotation detecting means detects a rotating direction and a rotating speed of said ship.

59. A ship maneuvering assistance system of claim 57, further comprising:

position detecting means for detecting a position of said ship with respect to the surface of the earth.

60. A ship maneuvering assistance system of claim 59, wherein said environment image generating means comprises:

land form storing means for storing signals representing land forms representative of an environment through which said ship maneuvers; and wherein said indicator also simultaneously displays said land forms in relation to said first area and said second area based on said position of said ship, said first and second areas being superimposed with and scaled to said displayed land forms.

61. A ship maneuvering assistance system of claim 57, wherein said environment image generating means comprises:

radar signal supply means for supplying radar image signals representative of an environment through which said ship maneuvers; and wherein said indicator also simultaneously displays a radar image based on said radar image signals in relation to said first area and said second area, said first and second areas being superimposed with and scaled to said displayed radar image.

62. A ship maneuvering assistance system of claim 57, wherein said indicator displays said first and second area by figures representing an approximation of a shape of a hull of said ship.

63. A body maneuvering assistance system comprising:

sensors which output signals indicating movements of a body, a signal generator generating signals representing at least a future predicted position and bearing of said body based on outputs of said sensors;

an image generator generating an image representative of an environment through which said body maneuvers; and an indicator displaying at least a graphical figure representing an approximation of a shape of said body and indicative of said future predicted position and bearing of said body in relation to a present position of said body, and said generated image, a size of said graphical figure being scaled approximately to a display of said generated image.

64. A body maneuvering assistance system of claim 63, wherein said signal generator further generates signals representing a present position and bearing of said body based on outputs of said sensors, and said indicator further displays a second graphical figure representing the approximation of the shape of said body and indicative of said present position and bearing of said body.

65. A body maneuvering assistance system of claim 64, wherein said sensors include, a velocity detecting unit which detects a velocity of a body, a bearing detecting unit which detects a bearing of said body with respect to a reference bearing, and a rate of turn establishing unit which establishes a turning speed of said body and wherein said signal generator includes, a coordinate-data generator which generates coordinate data representing said present position and bearing of said moving body based at least on said detected velocity and said detected bearing, and which generates said future predicted position and bearing of said body based at least on said present position of said body and said turning speed of said body.

66. A body maneuvering assistance system of claim 63, wherein said body is a ship; and said indicator displays said graphical figure in a shape of a hull of a ship.

67. A body maneuvering assistance system of claim 63, wherein said sensors include at least one velocity detecting unit which detects a velocity of said body.

68. A body maneuvering assistance system of claim 63, wherein said sensors include at least one Global Positioning System which detects a position of said body.

69. A body maneuvering assistance system comprising:

measuring means for measuring positions of a body;

generating means for generating signals representing at least a future predicted position and bearing of said body based on outputs of said measuring means;

image forming means for forming an image representative of an environment through which said body maneuvers; and an indicator displaying at least a graphical figure representing an approximation of a shape of said body and indicative of said future predicted position and bearing of said body in relation to a present position of said body, and said formed image, a size of said graphical figure being scaled approximately to a display of said generated image.

70. A body maneuvering assistance system of claim 69, wherein said generating means further generates signals representing a present position and bearing of said body based on outputs of said measuring means, and said indicator further displays a second graphical figure representing the approximation of the shape of said body and indicative of said present position and bearing of said body.

71. A body maneuvering assistance system of claim 70, wherein said measuring means includes, a velocity detecting unit which detects a velocity of said body, a bearing detecting unit which detects a bearing of said body with respect to a reference bearing, and a rate of turn establishing unit which establishes a turning speed of said body, and wherein said generating means includes, a coordinate-data generator which generates coordinate data representing said present position and bearing of said moving body based at least on said detected velocity and said detected bearing, and which generates said future predicted position and bearing of said body based at least on said present position of said body and said turning speed of said body.

72. A body maneuvering assistance system of claim 69, wherein said body is a ship, and said indicator displays said graphical figure in a shape of a hull of a ship.

73. A body maneuvering assistance system of claim 69, wherein said measuring means includes at least one velocity detecting unit which detects a velocity of said body.

74. A body maneuvering assistance system of claim 69, wherein said measuring means includes at least one Global Positioning System which detects a position of said body.

75. A display system of claim 69, wherein said image forming means comprises:

a land form generating means for generating land forms representative of an environment through which said body maneuvers.

76. A method of assisting maneuvering of a body, comprising:

a) measuring signals indicating movements of said body;

b) generating signals representing at least a future predicted position and bearing of said body based on said measured signals;

c) forming an image representative of an environment through which said body maneuvers; and d) displaying at least a graphical figure representing an approximation of a shape of said body and indicative of said future predicted position and bearing of said body in relation to a present position of said body, and said formed image, a size of said graphical figures being scaled approximately to a display of said formed image.

77. The method of claim 76, further comprising:

e) generating signals representing a present position and bearing of said body based on said measured signals, and f) displaying a second graphical figure representing the approximation of the shape of said body and indicative of said present position and bearing of said body.

78. A method of assisting maneuvering of a body, comprising:

a) measuring signals indicating positions of said body;

b) generating signals representing at least a future predicted position and bearing of said body based on said measured signals;

c) forming an image representative of an environment through which said body maneuvers; and d) displaying at least a graphical figure representing an approximation of a shape of said body and indicative of said future predicted position and bearing of said body in relation to a present position of said body, and said formed image, a size of said graphical figure being scaled approximately to a display of said formed image.

79. The method of claim 78, further comprising:

e) generating signals representing a present position and bearing of said body based on said measured signals, and f) displaying a second graphical figure representing the approximation of the shape of said body and indicative of said present position and bearing of said body.

80. The method of claim 79, wherein said step a) includes the substeps of, a1) detecting a velocity of said body, a2) detecting a bearing of said body with respect to a reference bearing, and a3) establishing a turning speed of said body, and wherein said step b) includes the substeps of, b1) generating coordinate data representing said present position and bearing of said moving body based at least on said detected velocity and said detected bearing, and generating said future predicted position and bearing of said body based at least on said present position of said body and said turning speed of said body.

81. The method of claim 78, wherein said step d) includes the substep of, d1) displaying said graphical figure in a shape of a hull of a ship.

82. The method of claim 78, wherein said step a) includes the substep of, a1) detecting a velocity of said body.

83. The method of claim 78, wherein said step a) includes the substep of, a1) detecting a position of said body by using a Global Positioning System.

* * * * *